(12) United States Patent
Phillips

(10) Patent No.: US 10,735,461 B2
(45) Date of Patent: Aug. 4, 2020

(54) METHOD FOR MINIMIZING THE RISK AND EXPOSURE DURATION OF IMPROPER OR HIJACKED DNS RECORDS

(71) Applicant: VERISIGN, INC., Reston, VA (US)

(72) Inventor: Denis Phillips, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 394 days.

(21) Appl. No.: 14/919,270

(22) Filed: Oct. 21, 2015

(65) Prior Publication Data

US 2017/0118250 A1  Apr. 27, 2017

(51) Int. Cl.
*H04L 29/12* (2006.01)
*H04L 29/06* (2006.01)
*H04L 29/08* (2006.01)

(52) U.S. Cl.
CPC ...... *H04L 63/1466* (2013.01); *H04L 61/1511* (2013.01); *H04L 63/1458* (2013.01); *H04L 67/02* (2013.01)

(58) Field of Classification Search
CPC . H04L 45/20; H04L 63/1466; H04L 63/1458; H04L 61/1511; H04L 67/02
USPC .......................................................... 726/1
See application file for complete search history.

(56) References Cited

U.S. PATENT DOCUMENTS

| | | | | |
|---|---|---|---|---|
| 5,822,434 A * | 10/1998 | Caronni | ................. | G06F 21/606 713/156 |
| 7,171,683 B2 * | 1/2007 | Pazi | ........................ | H04L 63/08 709/224 |
| 7,620,733 B1 * | 11/2009 | Tzakikario | .............. | G06F 15/16 709/229 |
| 7,873,731 B1 * | 1/2011 | Leavy | ................. | H04L 63/1416 709/225 |
| 8,954,609 B1 * | 2/2015 | Holleman | ............. | H04J 3/0667 709/203 |
| 8,966,122 B2 * | 2/2015 | Treuhaft | ............. | H04L 61/1511 709/245 |
| 9,276,902 B2 * | 3/2016 | Treuhaft | ........... | H04L 29/12066 |
| 9,602,482 B1 * | 3/2017 | Roth | ....................... | H04L 63/08 |
| 2003/0009594 A1 * | 1/2003 | McElligott | .............. | H04L 29/06 709/245 |
| 2004/0143579 A1 * | 7/2004 | Nakazawa | ........ | H04L 29/12066 |
| 2005/0210508 A1 * | 9/2005 | Lau | ........................ | H04L 67/306 725/46 |
| 2008/0060054 A1 * | 3/2008 | Srivastava | ........ | H04L 29/12066 726/2 |
| 2009/0210631 A1 * | 8/2009 | Bosworth | ........... | G06F 12/0875 711/141 |
| 2009/0327487 A1 * | 12/2009 | Olson | ............... | H04L 29/12066 709/224 |
| 2010/0274970 A1 * | 10/2010 | Treuhaft | ........... | H04L 29/12066 711/118 |

(Continued)

FOREIGN PATENT DOCUMENTS

CN          102624716 B  *  6/2014

*Primary Examiner* — Lynn D Feild
*Assistant Examiner* — Abdullah Almamun
(74) *Attorney, Agent, or Firm* — Artegis Law Group, LLP

(57) ABSTRACT

Provided is a method for assigning a time-to-live ("TTL") value for a domain name system ("DNS") record at a recursive DNS server. The method comprises obtaining, from a client, the TTL value for the DNS record; and storing, in a memory of the recursive DNS server, the TTL value, an identifier of the client, and the DNS record.

24 Claims, 8 Drawing Sheets

(56) References Cited

U.S. PATENT DOCUMENTS

| | | | |
|---|---|---|---|
| 2012/0096166 A1* | 4/2012 | Devarapalli | H04L 61/1511 709/226 |
| 2014/0068043 A1* | 3/2014 | Archbold | H04L 61/1511 709/223 |
| 2014/0082172 A1* | 3/2014 | Chueh | H04L 61/1511 709/223 |
| 2015/0058488 A1* | 2/2015 | Backholm | H04L 61/1511 709/226 |
| 2015/0281168 A1* | 10/2015 | Holloway | H04L 61/1552 709/245 |
| 2015/0304199 A1* | 10/2015 | Leask | H04L 43/0876 709/224 |
| 2016/0021055 A1* | 1/2016 | Krzywonos | H04L 61/1511 709/245 |
| 2016/0112500 A1* | 4/2016 | Kim | H04L 67/1031 709/226 |
| 2016/0164826 A1* | 6/2016 | Riedel | H04L 61/1511 709/223 |

\* cited by examiner

METHOD FOR MINIMIZING THE RISK AND EXPOSURE DURATION OF IMPROPER OR HIJACKED DNS RECORDS

FIELD

The present disclosure relates to the field of Domain Name System ("DNS") resolution.

BACKGROUND

A description of the ways in which the Internet is intrinsically organized can be helpful in understanding the challenges related to efficiently monitoring and rating the traffic for particular web sites on the internet.

The process of establishing a web site on the internet typically begins with a registrant registering a specific domain name through a registrar. The registrant is typically an individual or organization that identities a domain name, such as "example.com". The registrant contacts a registrar to process the name registration. The registrar then sends the necessary DNS information to a registry. A registrar may maintain a database containing additional customer information beyond that which is sent to the registry.

The registry receives DNS information from registrars, inserts that information into a database and propagates the information on the internet so that domain names can be found by users around the world.

In general, the DNS is the part of the Internet infrastructure that translates human-readable domain names into the Internet Protocol (IP) numbers needed to establish TCP/IP communication over the Internet. That is, DNS allows users to refer to web sites, and other resources, using easier to remember domain names, such as "www.example.com", rather than the numeric IP addresses, such as "123.4.56.78", assigned to computers on the Internet. Each domain name is made up of a series of character strings (labels) separated by dots. The rightmost label in a domain name is known as the "top-level domain" (TLD). Examples of well-known TLDs are ".com"; ".net"; ".org." etc. Each TLD supports second-level domains, listed immediately to the left of the TLD, e.g. the "example" level in "www.example.com". Each second-level domain can include a number of third-level domains located immediately to the left of the second-level domain, e.g. the "www" level in "www.example.com". There can be additional level domains as well, with virtually no limitation. For example, a domain with additional domain levels could be "www.photos.example.com".

Additional non-domain information may be included in a Uniform Resource Identifier ("URI") structure that includes the domain name. For example, a "path" part is a sequence of segments (conceptually similar to directories, though not necessarily representing them separated by a forward slash ("/"). This information may be included immediately to the right of the domain name, such as the "blog" in "www.example.com/blog", and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page that may be part of the same, or a different, domain.

Related domain names, and content, may be organized in a hierarchical, or nested, manner, such as "www.example.com"; "www.blog.example.com"; "www.example.com/blog"; or "blog.example.com" etc., each with a different significance. Such related domains need not share similarities in the actual IP address to which the various domain names resolve to, in this regard, part of the domain name may signify a particular server which is desired, for example, "mail.example.com" and www.example.com" may resolve to different servers, with different functions, for the same second-level domain.

The above registration and structural aspects of the internet are then used by end-user applications to find specific resources on the internet by using the DNS resolution process. Aspects of the DNS resolution process are discussed below to aid in an understanding of the subject matter of the present application.

The responsibility for operating each TLD (including maintaining a registry of the second-level domains within the TLD) is delegated to a particular domain name registry. The registry is responsible for converting domain names to IP addresses ("resolving") through DNS servers that maintain such information in large databases, and operating its top-level domain. The DNS stores IP addresses and domain names, facilitating service to addresses in TLDs, such as .com, .net, .edu, and .tv. Resolving is the process by which domain names are matched with corresponding IP numbers. Resolving is accomplished by a combination of computers and software, referred to as name servers, which use the data in the DNS to determine which IP numbers correspond to a particular domain name. The following general definitions will be used herein.

Resolve: To translate domain name to IP address.

Resolver: A computer that can respond to a query in order to resolve a domain name.

Name server: A computer receiving queries and answering them directly or via a resolver against other name servers.

Subnet: A group of IP addresses sharing an initial sequence of octets of the IP address.

Internet domains can be divided to groups according to their TLD suffix (e.g., .com, .net, .co.uk . . . ) with different registries responsible for each of them. A single registry may be responsible for several of these groups, such as the VeriSign registry which is responsible for .com and .net domains.

The DNS is implemented as a distributed database system, which uses the client-server model. The nodes of this database are the name servers. Each domain or subdomain has one or more authoritative DNS servers that publish information about that domain and the name servers of any domains subordinate to it. The top of the hierarchy is served by the root name servers, the servers to query when looking up (resolving) a TLD.

The DNS distributes the responsibility of assigning domain names and mapping those names to IP addresses by designating authoritative name servers for each domain. Authoritative name servers are assigned to be responsible for their particular domain.

In theory a fully qualified domain name may have several name segments, (e.g. www.one.type.example.com). For querying purposes, the name segment is typically interpreted by segment, from right to left. At each step along the way, a corresponding DNS server is queried to provide a pointer to the next server which it should consult.

Because of the huge volume of requests generated by DNS, the resolution process also allows for caching (i.e. the local recording and subsequent consultation of the results of a DNS query) for a given period of time after a successful answer. How long a resolver caches a DNS response (i.e. how long a DNS response is considered valid) is determined by a value called the time to live (TTL). The TTL is generally set by the administrator of the DNS server handling the response. The period of validity may vary from just seconds to days or even weeks.

Based on the DNS structure, as well as the caching function, there are two classifications typically applied to the name servers, authoritative and recursive (caching). An authoritative name server is a name server that gives original, definitive answers ("authoritative" answers) to DNS queries. Every domain name must be assigned a set of authoritative name servers that are responsible for resolving the domain name.

As indicated above, the DNS also uses recursive cache servers, which store DNS query results for a period of time determined TTL of the domain name record in question. Typically, such caching DNS servers also implement a recursive algorithm to resolve a given name starting with the DNS root through to the authoritative name servers of the queried domain. Internet service providers (ISPs) typically provide recursive and caching name servers for their customers. In addition, many home networking routers implement DNS caches and recursors to improve efficiency in the local network.

DNS "stub" resolvers are also known that essentially operate as a cache-less application to resolve DNS names into IP addresses. The DNS stub resolver forwards DNS queries to the DNS server configured for the workstation (or server) and returns the DNS server's response to the requesting software. If a stub resolver queries a caching nameserver for a record that is being held by the caching server before the TTL has expired, the caching server will reply with the cached resource record rather than retrieve it from the authoritative name server again.

DNS resolvers can cache results for a period of time up to the TTL of the DNS record that was retrieved. In order to handle invalid records (due to errors or malicious activity), most resolvers offer a mechanism for cache flushing to evict invalid records from their cache and therefore retrieve updated records. Operationally, it is often difficult for organizations systematically flush the cache of all of their internal resolvers. In addition, many organizations or individuals may not be aware of an issue with an invalid record and will not know to execute a cache flush. As a result, the invalid record can last for some time, possibly exposing them to malicious servers.

TLD attacks are relatively easy to perpetrate due to the nature of DNS communications. That is, DNS communications are typically sent via the User Datagram Protocol (UDP). UDP is a simple communication protocol for transmitting small data packets without a connection handshake, acknowledgment, ordering, or error correction. The low processing overhead of UDP makes it useful for streaming media applications such as video and Voice over IP, and for answering small queries from many sources, such as in DNS resolution. Unfortunately, these same properties allow attackers to use DNS resolution for nefarious purposes. Because UDP is connectionless, an attacker can "spoof" the source address (that is, forge a false source IP address in the IP packet such that the DNS server sends the query response to a third party) without having to worry about completing a connection handshake, resulting in the DNS server sending responses to a machine that never sent a query. Moreover, the query message can be relatively small (under 512 bytes) while the resulting response can be substantially larger due to large numbers of resource records in the response. This allows an attacker to hijack a DNS server to magnify an attack. DNS queries and response may also be sent over stateful Transmission Control Protocol (TCP), which exhibits similar vulnerabilities that can also be managed using embodiments of the invention disclosed herein.

SUMMARY

In accordance with aspects consistent with the present teachings, a method for a method for assigning a time-to-live ("TTL") value for a domain name system ("DNS") record at a recursive DNS server is provided. The method can comprise obtaining, from a client, the TTL value for the DNS record; and storing, in a memory of the recursive DNS server, the TTL value, an identifier of the client, and the DNS record.

In some aspects, the method can further comprise obtaining, from the client, a policy to be applied to the DNS record to control how the DNS record is processed.

In accordance with aspects consistent with the present teachings, a method for answering a domain name system ("DNS") request at a recursive DNS server is provided. The method can comprise obtaining, from a client, a DNS query for a DNS record; determining, by the recursive DNS server, that an answer to the DNS request is not found in a memory of the DNS recursive server; providing, by the recursive DNS server, the DNS query to an authoritative name server; obtaining, from the authoritative name server, the answer to the DNS request and a respective first time-to-live ("TTL") value for the answer; determining, at the recursive DNS server, that the first TTL value obtained from the authoritative name server exceeds a second TTL value provided by the client for the DNS request; storing, in the memory of the recursive DNS server, an association between the answer and the second TTL value; and returning the answer with the second TTL value to the client.

In some aspects, wherein returning the answer with the second TTL value, further comprises providing the answer and the second TTL value to an intermediate DNS server in communication with the client.

In some aspects, the method can further comprise decreasing the second TTL value in time increments subsequent to the determining that the first TTL value obtained from the authoritative name server exceeds the second TTL value.

In some aspects, the method can further comprise obtaining a command from the client to flush the memory of the recursive DNS server.

In some aspects, the method can further comprise obtaining, from the client, a subsequent DNS query for the DNS record; determining, by the recursive DNS server, that the answer to the DNS query is located in the memory; decreasing the second TTL value based on a time difference between the DNS query and the subsequent DNS query to produce third TTL; storing the third TTL value; returning the answer to the client with the third TTL value.

In some aspects, the method can further comprise retrieving a policy for the client; and returning the answer based on the policy.

In accordance with aspects consistent with the present teachings, a method for answering a domain name system ("DNS") request at a recursive DNS server is provided. The method can comprise obtaining, from a client, a DNS query for a DNS record; determining, by the recursive DNS server, that an answer to the DNS request is found in a memory of the DNS recursive server; determining, by the recursive DNS, that a time-to-live ("TTL") value set by the client is valid; retrieving a policy for the client; and returning an answer based on the policy and the TTL value to the client.

In accordance with aspects consistent with the present teachings, a device for assigning a time-to-live ("TTL") value for a domain name system ("DNS") record at a recursive DNS server is provided. The device can comprise a memory containing instructions; and at least one processor, operably connected to the memory, the executes the instructions to perform operations comprising: obtaining, from a client, the TTL value for the DNS record; and storing, in a memory of the recursive DNS server, the TTL value, an identifier of the client, and the DNS record.

In some aspects, wherein the at least one process is further operable to perform the operations comprising obtaining, from the client, a policy to be applied to the DNS record to control how the DNS record is processed.

In accordance with aspects consistent with the present teachings, a device for answering a domain name system ("DNS") request at a recursive DNS server is provided. The device can comprise a memory containing instructions; and at least one processor, operably connected to the memory, the executes the instructions to perform operations comprising: obtaining, from a client, a DNS query for a DNS record; determining, by the recursive DNS server, that an answer to the DNS request is not found in a memory of the DNS recursive server; providing, by the recursive DNS server, the DNS query to an authoritative name server; obtaining, from the authoritative name server, the answer to the DNS request and a respective first time-to-live ("TTL") value for the answer; determining, at the recursive DNS server, that the first TTL value obtained from the authoritative name server exceeds a second TTL value provided by the client for the DNS request; storing, in the memory of the recursive DNS server, an association between the answer and the second TTL value; and returning the answer with the second TTL value to the client.

In some aspects, wherein returning the answer with the second TTL value, further comprises providing the answer and the second TTL value to an intermediate DNS server in communication with the client. In some aspects, wherein the at least one process is further operable to perform the operations comprising decreasing the second TTL value in time increments subsequent to the determining that the first TTL value obtained from the authoritative name server exceeds the second TTL value. In some aspects, wherein the at least one process is further operable to perform the operations comprising obtaining a command from the client to flush the memory of the recursive DNS server. In some aspects, wherein the at least one process is further operable to perform the operations comprising: obtaining, from the client, a subsequent DNS query for the DNS record; determining, by the recursive DNS server, that the answer to the DNS query is located in the memory; decreasing the second TTL value based on a time difference between the DNS query and the subsequent DNS query to produce third TTL; storing the third TTL value; returning the answer to the client with the third TTL value. In some aspects, wherein the at least one process is further operable to perform the operations comprising: retrieving a policy for the client; and returning the answer based on the policy.

In accordance with aspects consistent with the present teachings, a device for answering a domain name system ("DNS") request at a recursive DNS server is provided. The device can comprise a memory containing instructions; and at least one processor, operably connected to the memory, the executes the instructions to perform operations comprising: obtaining, from a client, a DNS query for a DNS record; determining, by the recursive DNS server, that an answer to the DNS request is found in a memory of the DNS recursive server; determining, by the recursive DNS, that a time-to-live ("TTL") value set by the client is valid; retrieving a policy for the client; and returning an answer based on the policy and the TTL value to the client.

In accordance with aspects consistent with the present teachings, a computer readable medium having instructions to perform a method for assigning a time-to-live ("TTL") value for a domain name system ("DNS") record at a recursive DNS server is provided. The method can comprise obtaining, from a client, the TTL value for the DNS record; and storing, in a memory of the recursive DNS server, the TTL value, an identifier of the client, and the DNS record.

In accordance with aspects consistent with the present teachings, a computer readable medium having instructions to perform a method for answering a domain name system ("DNS") request at a recursive DNS server is provided. The method can comprise obtaining, from a client, a DNS query for a DNS record; determining, by the recursive DNS server, that an answer to the DNS request is not found in a memory of the DNS recursive server; providing, by the recursive DNS server, the DNS query to an authoritative name server; obtaining, from the authoritative name server, the answer to the DNS request and a respective first time-to-live ("TTL") value for the answer; determining, at the recursive DNS server, that the first TTL value obtained from the authoritative name server exceeds a second TTL value provided by the client for the DNS request; storing, in the memory of the recursive DNS server, an association between the answer and the second TTL value; and returning the answer with the second TTL value to the client.

In accordance with aspects consistent with the present teachings, a computer readable medium having instructions to perform a method for answering a domain name system ("DNS") request at a recursive DNS server is provided. The method can comprise obtaining, from a client, a DNS query for a DNS record; determining, by the recursive DNS server, that an answer to the DNS request is found in a memory of the DNS recursive server; determining, by the recursive DNS server, that a time-to-live ("TTL") value set by the client is valid; retrieving a policy for the client; and returning an answer based on the policy and the TTL value to the client.

BRIEF DESCRIPTION OF THE DRAWINGS

The accompanying drawings, which are incorporated in and constitutes a part of this specification, illustrates an embodiment of the present teachings and together with the description, serves to explain the principles of the present teachings. In the figures.

Figure 1:
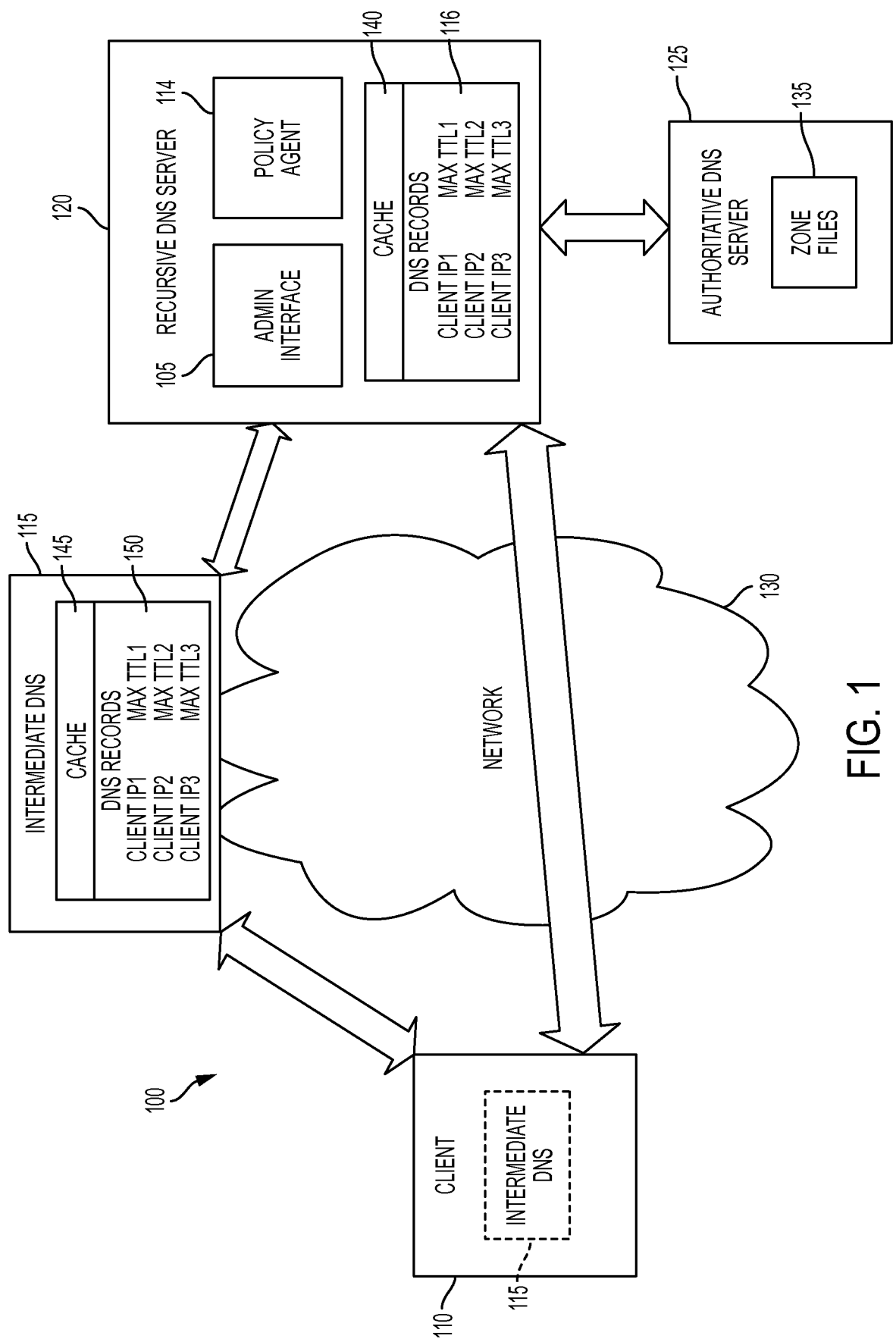
FIG. 1 is an exemplary network layout 100 for use with the methods and systems described herein according to embodiments.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawings. In the drawings, like reference numerals have been used throughout to designate identical elements, where convenient. In the following description, reference is made to the accompanying drawings that form a part of the description, and in which is shown by way of illustration one or more specific example embodiments in which the present teachings may be practiced.

Further, notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

Generally speaking, aspects consistent with the present disclosure allow a user of a Recursive Service to set a maximum TTL on any record that they receive. In this case, if a record has been misconfigured or hijacked on the authoritative server, the exposure to such a bad record will be reduced when the maximum TTL is set to a lower value. This, coupled with the Recursive Service's cache flush feature, will provide a mechanism for quickly removing invalid records from an entire organization. This allows for a greatly reduced operational burden in the face of invalid DNS records. In many cases, this will reduce an organization's exposure dramatically even if they are unaware of an issue. In some aspects, a mechanism is provided for configuring a maximum TTL value returned for any DNS record, which can be applied by a configured set of source IPs to differentiate the service among customers/users.

FIG. 1 is an exemplary network layout 100 for use with the methods and systems described herein. User device or client 110 may represent any type of device that connects to Network 130; for example, a personal computer, tablet PC, cellular telephone, Personal Digital Assistant (PDA), and the like. User device 110 has a connection with at least one Intermediate DNS resolver 115 (also called "Intermediate DNS name server" or "Internal Forwarder") through either a wired, wireless, or other type of network connection. In some embodiments, intermediate DNS resolver 115 may be part of User device 110; in other embodiments, DNS resolver 102 may be a separate device, and may also be located in the same location or in a different location as User device 110. In the embodiment where the intermediate DNS Resolver 115 is part of the User device 110, shown by dotted line in FIG. 1, the intermediate DNS resolver 155 can be a DNS service provided as a stub resolver, and/or at an application, operating system, or other software layer on the User device 110. In the embodiment where the intermediate DNS resolver 115 is a separate device, the intermediate DNS resolver 115 can be one or more intermediate DNS resolvers, such as an internal server within a corporate intranet or part of an internet service provide ("ISP"). Each of the one or more intermediate DNS resolver 115 includes one or more data caches, such as cache 145, for storing DNS records 150. For example, cache 145 contains records of client IP addresses and associated maximum TTL values as set by an operator of the IP address.

User device 110 and intermediate DNS resolver 115 has a connection with Recursive DNS Server 120 through either a wired, wireless, or other type of network connection to network 130. Recursive DNS server 120 can comprise, among other things, administration interface 105, policy agent 114, and cache 140. Administration interface 105 allows users a portal with which they can log into recursive DNS server 120 and manage one or more domains, records, IP addresses, or other parameters. Administration interface 105 also allows users the ability to select or provide one or more policy through policy agent 114 related to the one or more domains, records, IP addresses, or other parameters. Administration interface 105 can also allow user to select or choose a maximum TTL value to be associated with a particular IP address, which can then be stored in cache 140 and be used with policy agent 114 in communicating with User device or client 110.

Recursive DNS server 120 has a connection with authoritative DNS server 125 using network 130 through either a wired, wireless, or other type of network connection to network 130 or another network. Authoritative DNS server 125 comprises, among other things, a database storing one or more zone files 135. In some embodiments, network 130 can be the Internet, though it may also be another similar network. In some embodiments, user device 110 may connect to network 130 independently of intermediate DNS resolver 115; in other embodiments, user device 110 may connect to network 130 through the same connection as intermediate DNS resolver 115.

Figure 2:
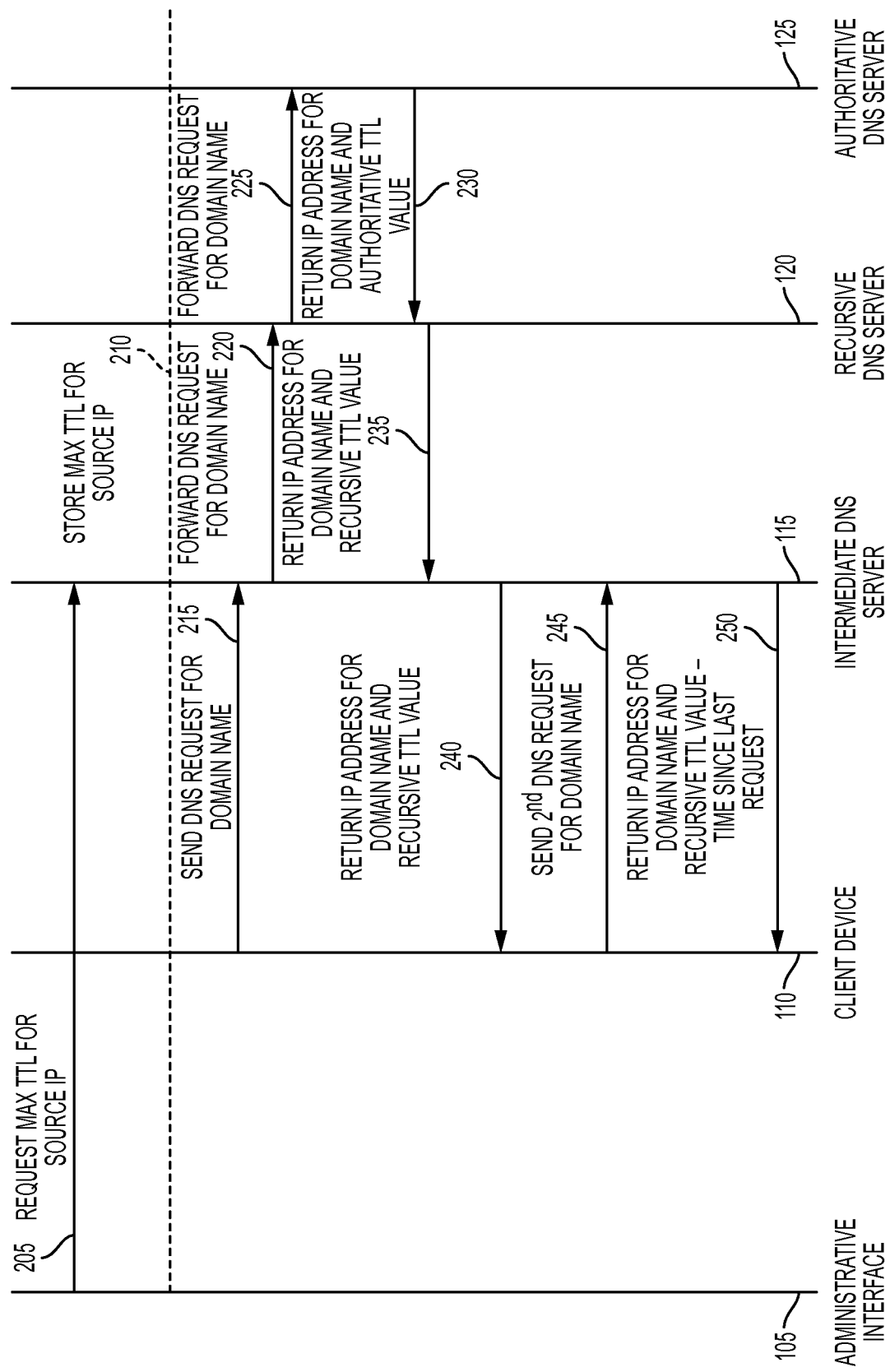
FIG. 2 shows an example DNS process according to embodiments.

FIG. 2 shows an example DNS process according to embodiments. At 205, a user at a client device logs into an administrative portal or interface 105 of the recursive name server and sets a maximum TTL value for a source IP, which is stored, at 210, in a domain record at the recursive DNS name server 120. The TTL for the source ($TTL_{source}$) will typically be less than the TTL maintained at the authoritative DNS name server 125 ($TTL_{auth}$). For example, the user sets the maximum $TTL_{source}$=300 seconds. At a later time, the user enters into a browser at the client device 110 a destination domain name at 215. If the corresponding IP address of the domain name is not found in the cache of the client device 110 (i.e., in the stub resolver), the cache of an intermediate DNS name server 115 (i.e., an internal network name server or an ISP in an exterior network) at 220, the domain name request is forwarded through the intermediate layers to the authoritative DNS name server 125 at 225. The authoritative DNS name server 125 locates the corresponding IP address for the requested domain name and returns the domain record to the recursive DNS name server 120 with a TTL value maintained at the authoritative DNS name server 125 at 230. Upon the recursive DNS name server 120 receiving the domain record with the IP address and the TTL value of the authoritative DNS name server 125, for example $TTL_{auth}$=1000 seconds, the recursive DNS name server 120 determines whether or not the source IP that requested the IP address has previously set a maximum TTL that it is willing to receive. In this case, the source IP has set a maximum $TTL_{source}$=300 seconds. The recursive DNS name server 120, then stores the answer in cache and returns the IP address with the $TTL_{source}$=300 seconds to the intermediate DNS name server 115 that requested the IP address at 235. After this, the value of the $TTL_{source}$ at the recursive DNS name server 120 begins to decrement in intervals of seconds (or sub-second intervals) until the value reaches zero and the recursive DNS name server 120 must then forward any DNS queries for which the tTTL has expired to the authoritative DNS name server 125. The intermediate DNS name server 125 receive the IP address with the $TTL_{source}=300$ seconds from the recursive DNS name server 120 and then stores this answer in cache and returns it to the client device 110 at 240. As the with the recursive DNS name server 120, the value of the $TTL_{source}$ begins to decrement in intervals of seconds (or sub-second intervals).

At a subsequent time, for example 100 seconds after the initial DNS request by the client device 100, the client device 110 sends another DNS request for the domain name that was previously requested at 245. The request is first received at the cache of stub resolver at the client device 110 or intermediate DNS server 115, where the $TTL_{source}$ now equals 200 seconds (100 seconds from the initial request). The stub resolver or the intermediate DNS server 115 then returns the IP address with the $TTL_{source}=200$ seconds at 250.

Figure 3:
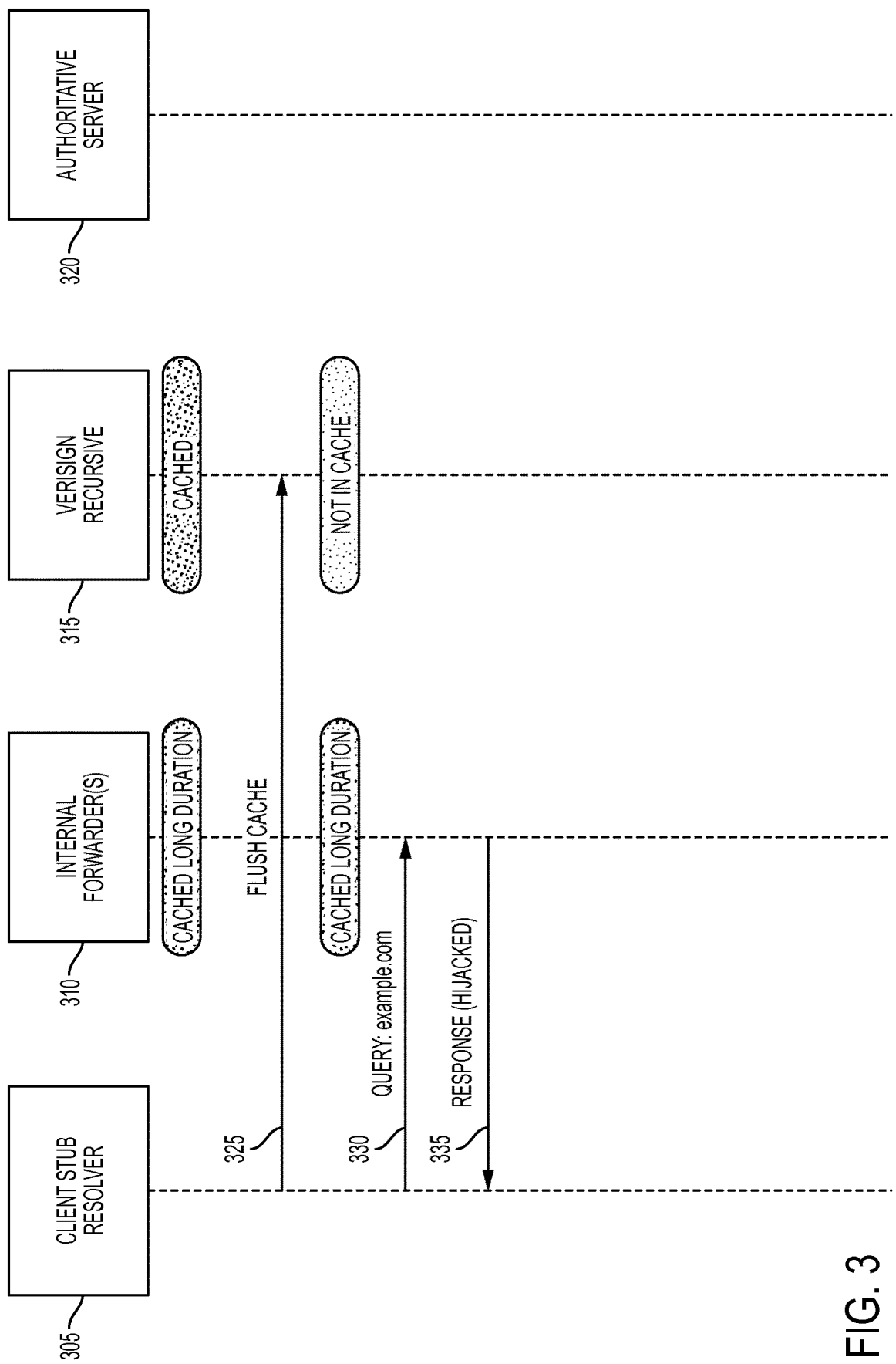
FIG. 3 shows an example scenario for maximum time-to-live ("TTL") with cache flush according to embodiments.

FIGS. 3-7 will be discussed below with regard to client stub resolver 305, internal forwarder(s) 310, recursive resolver 315, and authoritative server 320. FIG. 3 show a scenario for max TTL cache flush according to embodiments. In the scenario depicted in FIG. 3, internal forwarder(s) 310 maintains a cache having a long duration. At 325, client stub resolver 305 sends a flush cache command to recursive resolver 315. Subsequent to receiving the command, recursive resolver 315 flushes its cache. At 330, client stub resolver 305 sends a DNS query for domain example.com to internal forwarder(s) 310. Because, in this instance, internal forwarder(s) 310 maintain a cache having a long duration and the cache flush command was not received by internal forwarder(s) 310, internal forwarder(s) 310 returns an answer to the DNS query to client stub resolver 305 that is likely corrupt or has been hijacked.

Figure 4:
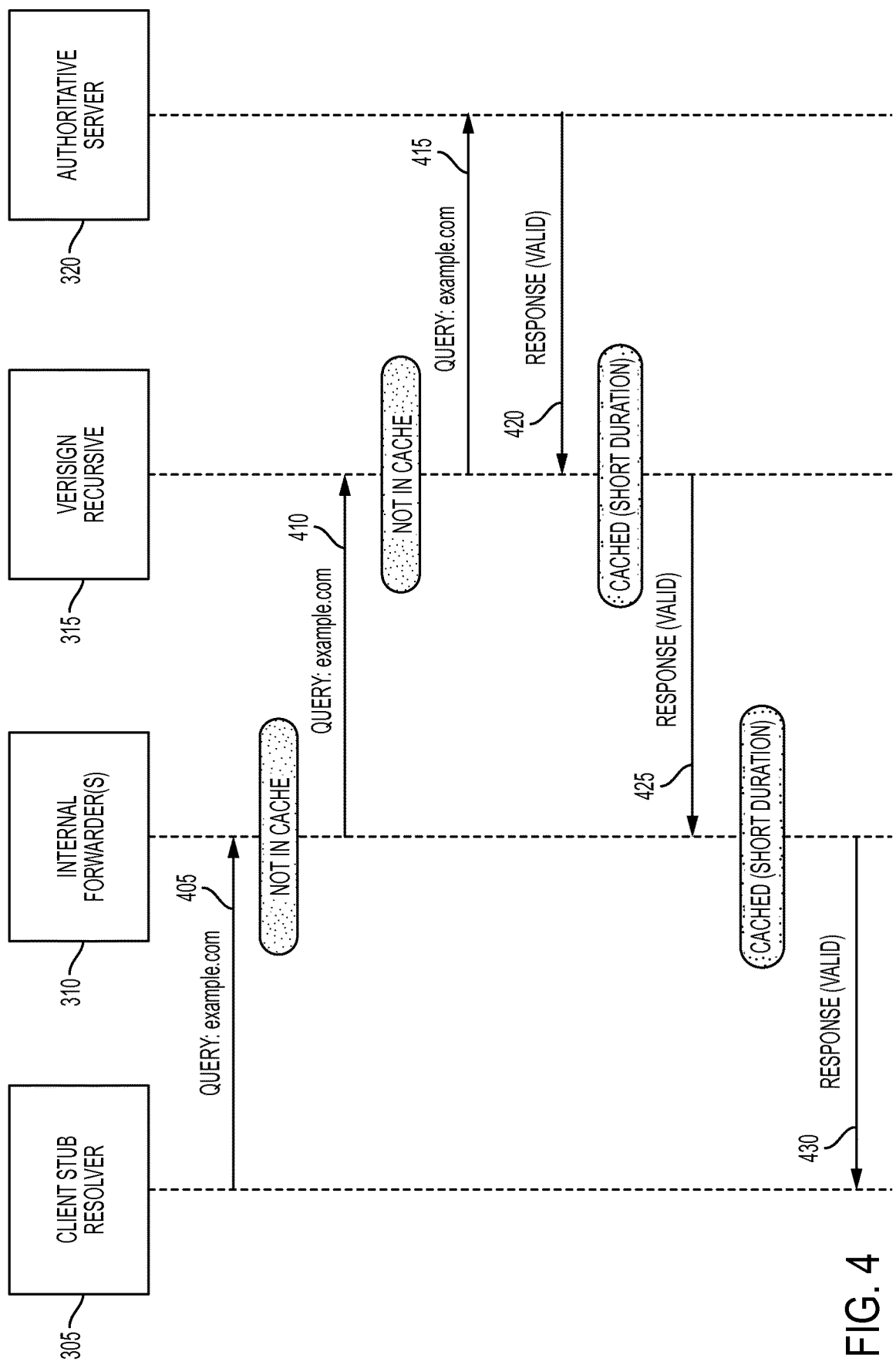
FIG. 4 shows an example scenario for maximum TTL and low TTL according to embodiments.

FIG. 4 shows a scenario for max TTL low TTL according to embodiments. At 405, client stub resolver 305 sends a DNS query for domain example.com to internal forwarder(s) 310. In this example, internal forwarder(s) 310 do not have the answer for the DNS query in its cache. At 410, internal forwarder(s) forwards the DNS query to recursive resolver 315. Again in this example, recursive resolver 315 does not have the answer for the DNS query in its cache. At 415, recursive resolver 315 forwards the DNS query to authoritative server 320. At 420, authoritative server 320 returns an answer to the DNS query to recursive server 315, where the answer is cached with recursive resolver 315 for a short duration. At 425, recursive resolver 315 forwards the answer to internal forwarder(s) 310, where the answer is cached with internal forwarder(s) 310 for a short duration, which may be same time length of the recursive resolver 315. At 430, internal forwarder(s) 310 returns the answer to client stub resolver 305.

Figure 5:
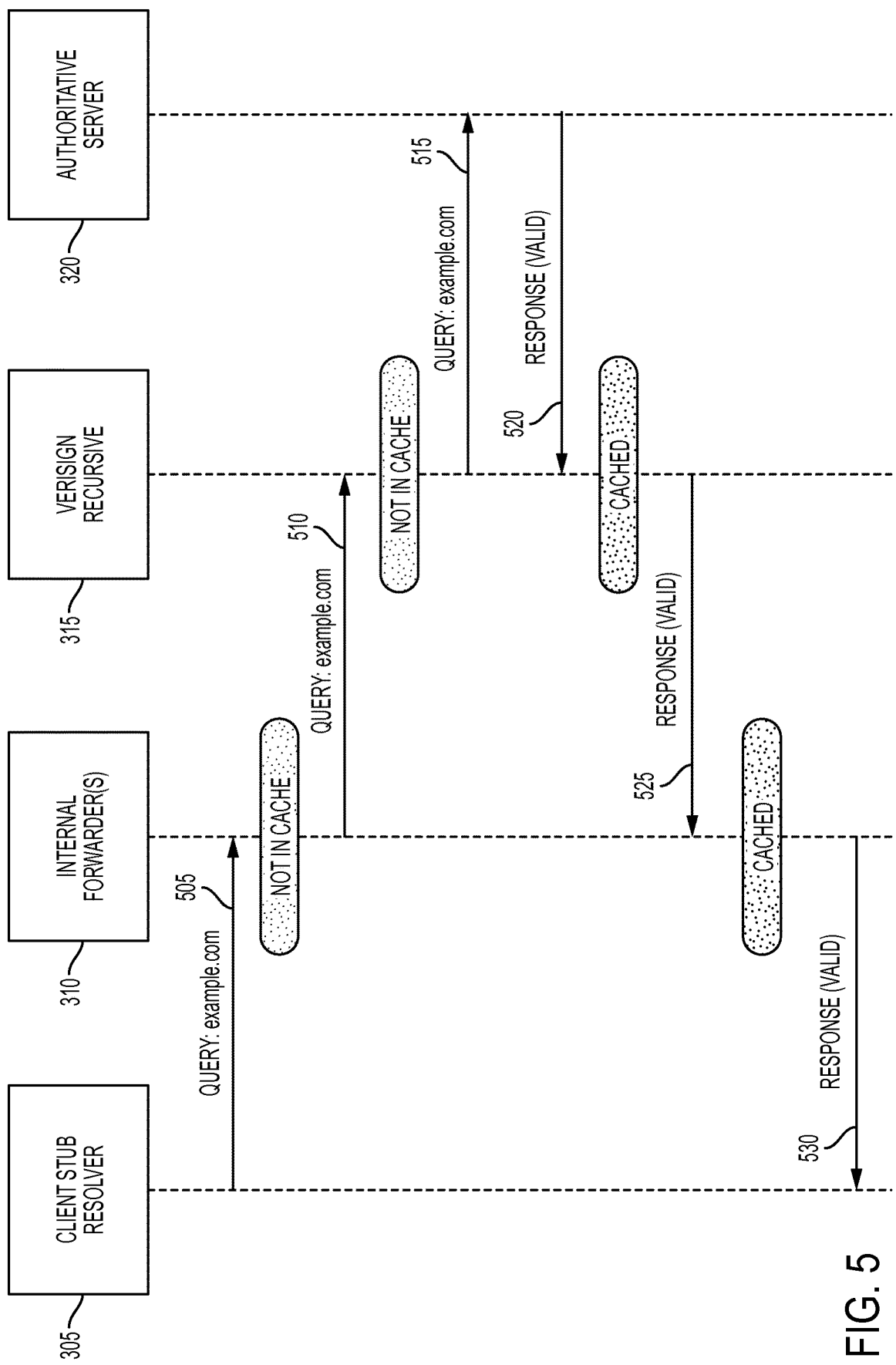
FIG. 5 shows an example scenario for maximum TTL with normal network flow according to embodiments.

FIG. 5 shows a scenario for max TTL normal flow according to embodiments. At 505, client stub resolver 305 sends a DNS query for domain example.com to internal forwarder(s) 310. In this example, internal forwarder(s) 310 do not have the answer for the DNS query in its cache. At 510, internal forwarder(s) forwards the DNS query to recursive resolver 315. Again in this example, recursive resolver 315 does not have the answer for the DNS query in its cache. At 515, recursive resolver 315 forwards the DNS query to authoritative server 320. At 520, authoritative server 320 returns an answer to the DNS query to recursive server 315, where the answer is cached with recursive resolver 315. At 525, recursive resolver 315 forwards the answer to internal forwarder(s) 310, where the answer is cached with internal forwarder(s) 310, which may be the same time length of the recursive resolver 315. At 530, internal forwarder(s) 310 returns the answer to client stub resolver 305.

Figure 6:
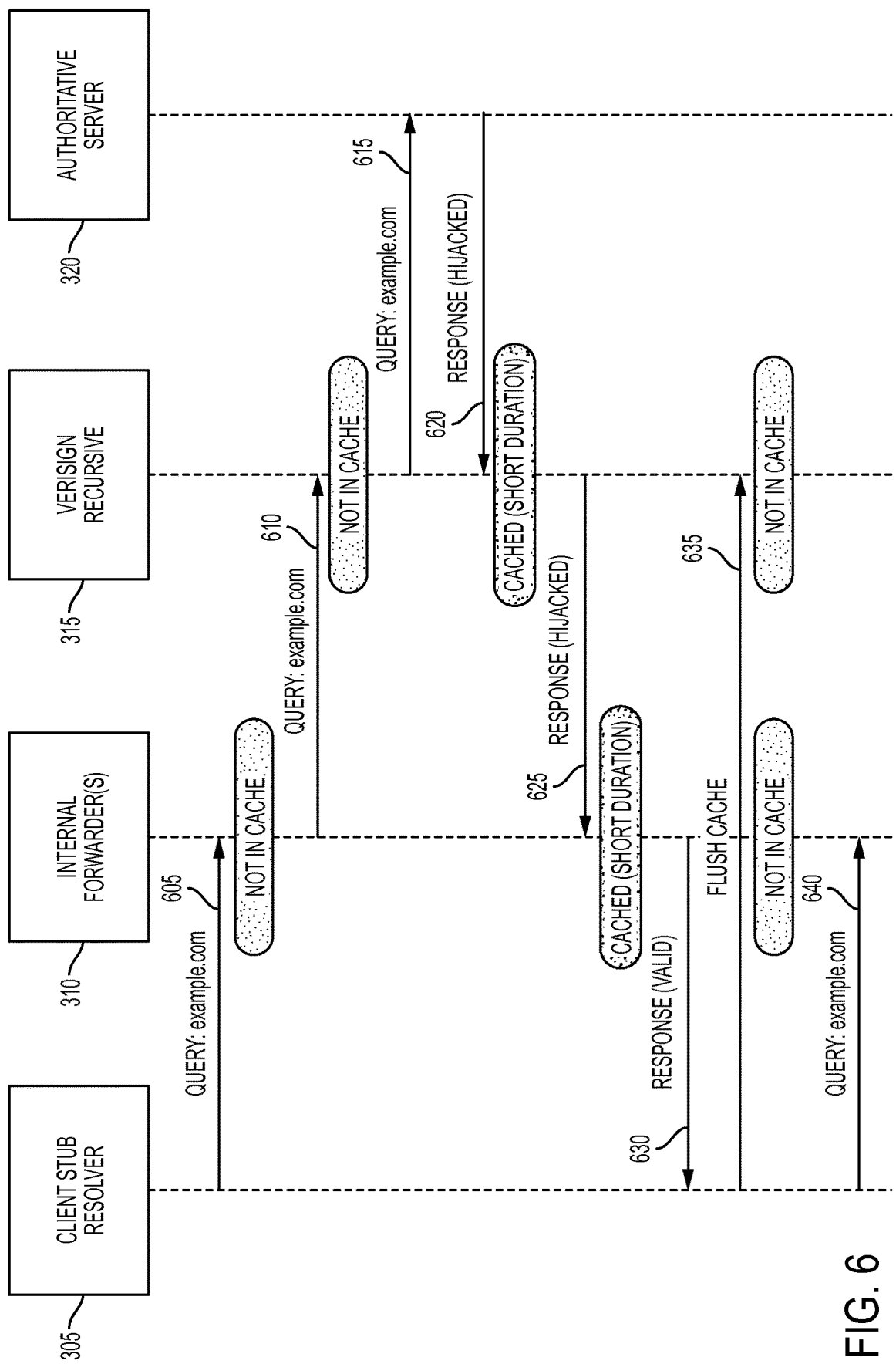
FIG. 6 shows an example scenario for maximum TTL and low TTL with a hijacked result according to embodiments.

FIG. 6 shows a scenario for max TTL low TTL hijacked according to embodiments. At 605, client stub resolver 305 sends a DNS query for domain example.com to internal forwarder(s) 310. In this example, internal forwarder(s) 310 do not have the answer for the DNS query in its cache. At 610, internal forwarder(s) forwards the DNS query to recursive resolver 315. Again in this example, recursive resolver 315 does not have the answer for the DNS query in its cache. At 615, recursive resolver 315 forwards the DNS query to authoritative server 320. At 620, authoritative server 320 returns an answer that has been corrupted or hijacked to the DNS query to recursive server 315, where the answer is cached with recursive resolver 315 for a short duration. At 625, recursive resolver 315 forwards the corrupted or hijacked answer to internal forwarder(s) 310, where the answer is cached with internal forwarder(s) 310 for a short duration, which may be the same time length of the recursive resolver 315. At 630, internal forwarder(s) 310 returns the answer to client stub resolver 305. At 635, client stub resolver 305 sends a flush cache command to internal forwarder(s) 310 and recursive resolver 315, where their respective caches are flushed. At 640, client stub resolver 305 sends another DNS query for domain example.com to internal forwarder(s).

Figure 7:
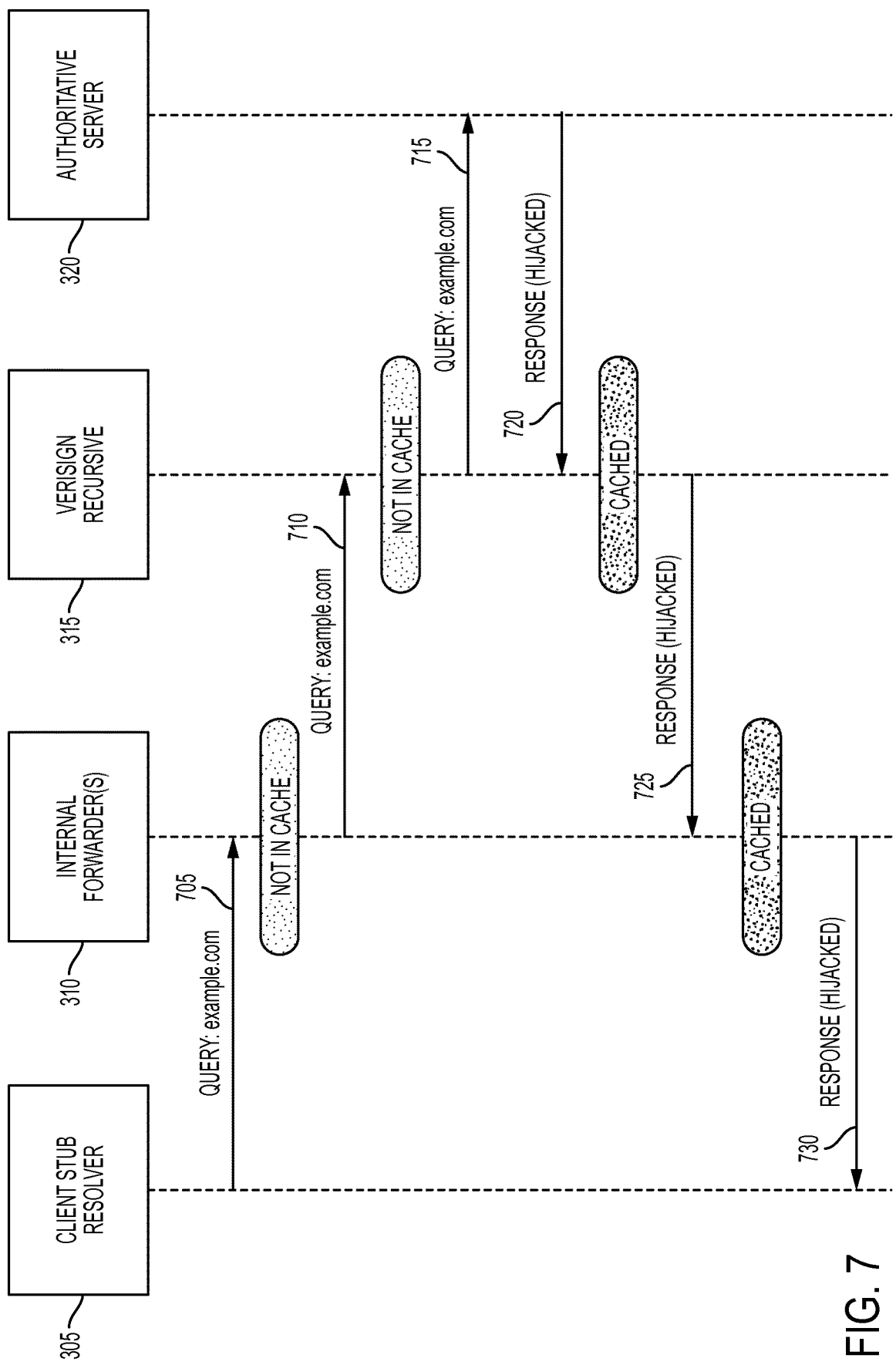
FIG. 7 shows an example scenario for maximum TTL with a hijacked result according to embodiments.

FIG. 7 shows a scenario for max TTL hijacked according to embodiments. At 705, client stub resolver 305 sends a DNS query for domain example.com to internal forwarder(s) 310. In this example, internal forwarder(s) 310 do not have the answer for the DNS query in its cache. At 710, internal forwarder(s) forwards the DNS query to recursive resolver 315. Again in this example, recursive resolver 315 does not have the answer for the DNS query in its cache. At 715, recursive resolver 315 forwards the DNS query to authoritative server 320. At 720, authoritative server 320 returns an answer that has been corrupted or hijacked to the DNS query to recursive server 315, where the answer is cached with recursive resolver 315. At 725, recursive resolver 315 forwards the corrupted or hijacked answer to internal forwarder(s) 310, where the answer is cached with internal forwarder(s) 310, which may be same time length of the recursive resolver 315. At 730, internal forwarder(s) 310 returns the corrupted or hijacked answer to client stub resolver 305.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
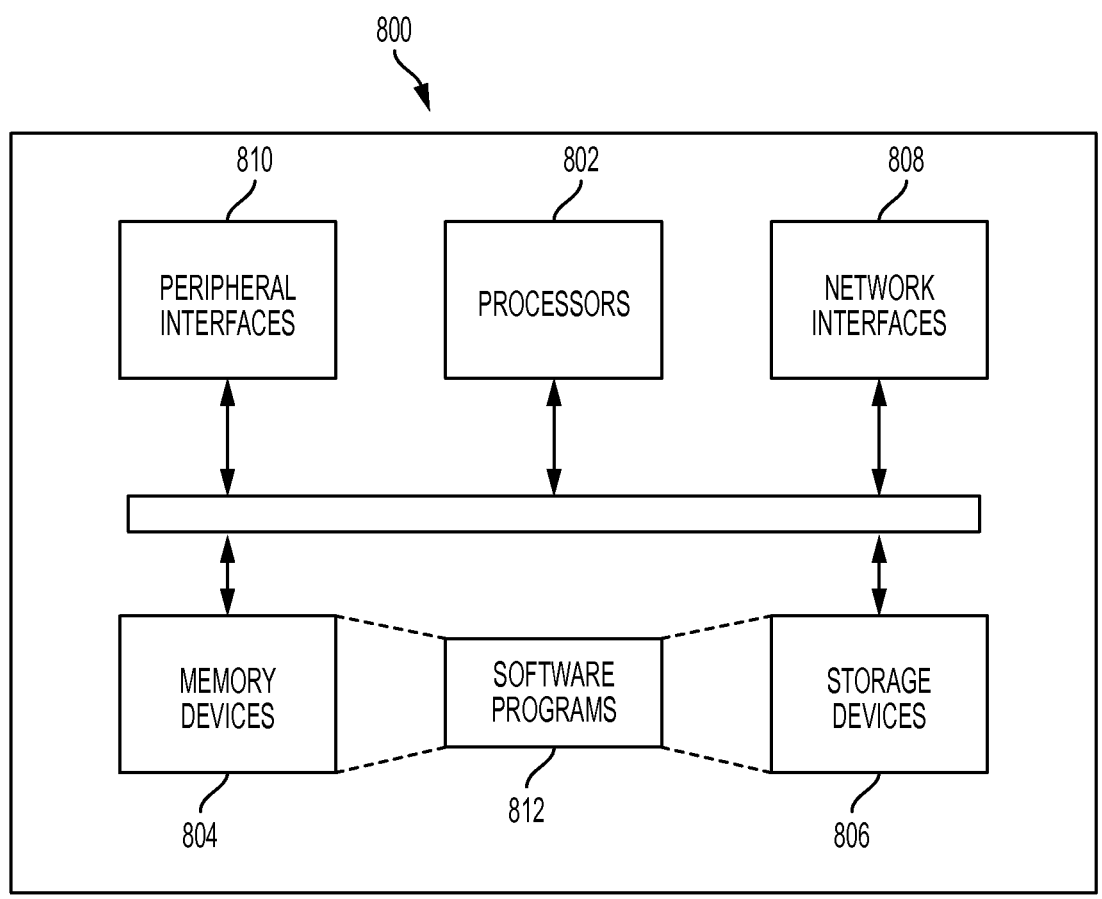
FIG. 8 shows an example computer system according to embodiments.

For example, FIG. 8 illustrates an example of a hardware configuration for a computer device 800, that can be used to perform one or more of the processes described above. While FIG. 8 illustrates various components contained in the computer device 800, FIG. 8 illustrates one example of a computer device and additional components can be added and existing components can be removed.

The computer device 800 can be any type of computer devices, such as desktops, laptops, servers, etc., or mobile devices, such as smart telephones, tablet computers, cellular telephones, personal digital assistants, etc. As illustrated in FIG. 8, the computer device 800 can include one or more processors 802 of varying core configurations and clock frequencies. The computer device 800 can also include one or more memory devices 804 that serve as a main memory during the operation of the computer device 800. For example, during operation, a copy of the software that supports the DNS operations can be stored in the one or more memory devices 804. The computer device 800 can also include one or more peripheral interfaces 806, such as keyboards, mice, touchpads, computer screens, touchscreens, etc., for enabling human interaction with and manipulation of the computer device 800.

The computer device 800 can also include one or more network interfaces 808 for communicating via one or more networks, such as Ethernet adapters, wireless transceivers, or serial network components, for communicating over wired or wireless media using protocols. The computer device 800 can also include one or more storage device 810 of varying physical dimensions and storage capacities, such as flash drives, hard drives, random access memory, etc., for storing data, such as images, files, and program instructions for execution by the one or more processors 802.

Additionally, the computer device 800 can include one or more software programs 812 that enable the functionality described above. The one or more software programs 812 can include instructions that cause the one or more processors 802 to perform the processes described herein. Copies of the one or more software programs 812 can be stored in the one or more memory devices 804 and/or on in the one or more storage devices 810. Likewise, the data, for example, DNS records, utilized by one or more software programs 812 can be stored in the one or more memory devices 804 and/or on in the one or more storage devices 810.

In implementations, the computer device 800 can communicate with other devices via a network 816. The other devices can be any types of devices as described above. The network 816 can be any type of network, such as a local area network, a wide-area network, a virtual private network, the Internet, an intranet, an extranet, a public switched telephone network, an infrared network, a wireless network, and any combination thereof. The network 816 can support communications using any of a variety of commercially-available protocols, such as TCP/IP, UDP, OSI, FTP, UPnP, NFS, CIFS, AppleTalk, and the like. The network 816 can be, for example, a local area network, a wide-area network, a virtual private network, the Internet, an intranet, an extranet, a public switched telephone network, an infrared network, a wireless network, and any combination thereof.

The computer device 800 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 800 as described above need not be enclosed within a single enclosure or even located in close proximity to one another. Those skilled in the art will appreciate that the above-described componentry are examples only, as the computer device 800 can include any type of hardware componentry, including any necessary accompanying firmware or software, for performing the disclosed implementations. The computer device 800 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for assigning a time-to-live ("TTL") value for a domain name system ("DNS") record at a recursive DNS server, the method comprising:
    determining, by the recursive DNS server, a policy indicating that a maximum TTL value is applicable to one or more DNS requests received by the recursive DNS server from a first client device;
    determining, at the recursive DNS server, that the maximum TTL value is less than a first TTL value for a first DNS record, wherein the first TTL value is included in a first answer received by the recursive DNS server from an authoritative name server in response to a first DNS request received from the first client device and forwarded to the authoritative name server, wherein the maximum TTL value is applicable to the first DNS request; and
    in response, storing, in a memory of the recursive DNS server, an association between the maximum TTL value and the first DNS record based on the policy.

2. The method of claim 1, further comprising obtaining, from a client device, the policy to be applied to the first DNS record to control how the first DNS record is processed.

3. A method for answering a domain name system ("DNS") request at a recursive DNS server, the method comprising:
    determining, by the recursive DNS server, a maximum time-to-live ("TTL") value applicable to one or more DNS requests received by the recursive DNS server;
    obtaining, by the recursive DNS server and from a client device, a DNS request for a DNS record;
    determining, by the recursive DNS server, that no answer to the DNS request is found in a memory of the recursive DNS server;
    providing, by the recursive DNS server, the DNS request to an authoritative name server;
    receiving, by the recursive DNS server and from the authoritative name server, a first answer to the DNS request that includes a first TTL value for the first answer;
    determining, at the recursive DNS server, that the maximum TTL value is applicable to the DNS request;
    determining, at the recursive DNS server, that the first TTL value included in the first answer to the DNS request received from the authoritative name server exceeds the maximum TTL value;
    retrieving a policy associated with processing DNS requests received from the client device; and
    in response to determining that the first TTL value exceeds the maximum TTL value, returning, based on the policy, a second answer with the maximum TTL value to the client device.

4. The method of claim 3, wherein returning the second answer with the maximum TTL value further comprises providing the second answer and the maximum TTL value to an intermediate DNS server in communication with the client device.

5. The method of claim 3, further comprising decreasing the maximum TTL value in time increments subsequent to the determining that the first TTL value received from the authoritative name server exceeds the maximum TTL value.

6. The method of claim 3, further comprising obtaining a command from the client device to flush the memory of the recursive DNS server by removing DNS records associated with invalid TTL values from the memory of the recursive DNS server.

7. The method of claim 3, further comprising:
    obtaining, from the client device, a subsequent DNS query for the DNS record;
    determining, by the recursive DNS server, that the first answer to the subsequent DNS query is located in the memory of the recursive DNS server;
    decreasing the maximum TTL value based on a time difference between the subsequent DNS query and the DNS request to produce a second TTL value;
    storing the second TTL value; and
    returning the first answer to the client device with the second TTL value.

8. A method for answering a domain name system ("DNS") request at a recursive DNS server, the method comprising:
    determining, by the recursive DNS server, a maximum time-to-live ("TTL") value applicable to one or more DNS requests received by the recursive DNS server;
    obtaining, by the recursive DNS server and from a client device, a DNS request for a DNS record;
    determining, by the recursive DNS server, that an answer to the DNS request is found in a memory of the recursive DNS server;
    determining, at the recursive DNS server, that the maximum TTL value is applicable to the DNS request;
    determining, by the recursive DNS server, that the maximum TTL value is less than a first TTL value for the answer to the DNS request, wherein the first TTL value is included in a first answer received by the recursive DNS server from an authoritative name server;
    retrieving a policy for the client device; and
    in response to determining that the maximum TTL value is less than the first TTL value, returning a second answer based on the policy and the maximum TTL value to the client device.

9. A device for assigning a time-to-live ("TTL") value for a domain name system ("DNS") record at a recursive DNS server, the device comprising:
    one or more memories containing instructions; and
    at least one processor, operably connected to the one or more memories, that executes the instructions to perform operations comprising:
        determining, by the recursive DNS server, a policy indicating that a maximum TTL value is applicable to one or more DNS requests received by the recursive DNS server from a first client device;

determining, at the recursive DNS server, that the maximum TTL value is less than a first TTL value for a first DNS record, wherein the first TTL value is included in a first answer received by the recursive DNS server from an authoritative name server in response to a first DNS request received from the first client device and forwarded to the authoritative name server, wherein the maximum TTL value is applicable to the first DNS request; and in response, storing, in a memory of the recursive DNS server, an association between the maximum TTL value and the first DNS record based on the policy.

10. The device of claim 9, wherein the at least one processor is further operable to perform the operations comprising obtaining, from a client device, the policy to be applied to the first DNS record to control how the first DNS record is processed.

11. A device for answering a domain name system ("DNS") request at a recursive DNS server, the device comprising:
one or more memories containing instructions; and
at least one processor, operably connected to the one or more memories, that executes the instructions to perform operations comprising:
determining, by the recursive DNS server, a maximum time-to-live ("TTL") value applicable to one or more DNS requests received by the recursive DNS server;
obtaining, by the recursive DNS server and from a client device, a DNS request for a DNS record;
determining, by the recursive DNS server, that no answer to the DNS request is found in a memory of the recursive DNS server;
providing, by the recursive DNS server, the DNS request to an authoritative name server;
receiving, by the recursive DNS server and from the authoritative name server, a first answer to the DNS request that includes a first TTL value for the first answer;
determining, at the recursive DNS server, that the maximum TTL value is applicable to the DNS request;
determining, at the recursive DNS server, that the first TTL value included in the first answer to the DNS request received from the authoritative name server exceeds the maximum TTL value;
retrieving a policy associated with processing DNS requests received from the client device; and
in response to determining that the first TTL value exceeds the maximum TTL value, returning, based on the policy, a second answer with the maximum TTL value to the client device.

12. The device of claim 11 wherein returning the second answer with the maximum TTL value further comprises providing the second answer and the maximum TTL value to an intermediate DNS server in communication with the client device.

13. The device of claim 11, wherein the at least one processor is further operable to perform the operations comprising decreasing the maximum TTL value in time increments subsequent to the determining that the first TTL value received from the authoritative name server exceeds the maximum TTL value.

14. The device of claim 11, wherein the at least one processor is further operable to perform the operations comprising obtaining a command from the client device to flush the memory of the recursive DNS server by removing DNS records associated with invalid TTL values from the memory of the recursive DNS server.

15. The device of claim 11, wherein the at least one processor is further operable to perform the operations comprising:
obtaining, from the client device, a subsequent DNS query for the DNS record;
determining, by the recursive DNS server, that an answer to the subsequent DNS query is located in the memory of the recursive DNS server;
decreasing the maximum TTL value based on a time difference between the subsequent DNS query and the DNS request to produce a second TTL value;
storing the second TTL value; and
returning the answer to the subsequent DNS query to the client device with the second TTL value.

16. A device for answering a domain name system ("DNS") request at a recursive DNS server, the device comprising:
a memory containing instructions; and
at least one processor, operably connected to the memory, that executes the instructions to perform operations comprising:
receiving, by the recursive DNS server, a maximum time-to-live ("TTL") value applicable to one or more DNS requests received by the recursive DNS server;
obtaining, by the recursive DNS server and from a client device, a DNS request for a DNS record;
determining, by the recursive DNS server, that an answer to the DNS request is found in a memory of the recursive DNS server;
determining, at the recursive DNS server, that the maximum TTL value is applicable to the DNS request;
determining, by the recursive DNS server, that the maximum TTL value is less than a first TTL value for the answer to the DNS request, wherein the first TTL value is included in a first answer received by the recursive DNS server from an authoritative name server;
retrieving a policy for the client device; and
in response to determining that the maximum TTL value is less than the first TTL value, returning a second answer based on the policy and the maximum TTL value to the client device.

17. One or more non-transitory computer readable media having instructions to perform a method for assigning a time-to-live ("TTL") value for a domain name system ("DNS") record at a recursive DNS server, the method comprising:
determining, by the recursive DNS server, a policy indicating that a maximum TTL value is applicable to one or more DNS requests received by the recursive DNS server from a first client device;
determining, at the recursive DNS server, that the maximum TTL value is less than a first TTL value for a first DNS record, wherein the first TTL value is included in a first answer received by the recursive DNS server from an authoritative name server in response to a first DNS request received from the first client device and forwarded to the authoritative name server, wherein the maximum TTL value is applicable to the first DNS request; and
in response, storing, in a memory of the recursive DNS server, an association between the maximum TTL value and the first DNS record based on the policy.

18. The one or more non-transitory computer readable media of claim 17, further comprising obtaining, from a client device, the policy to be applied to the first DNS record to control how the first DNS record is processed.

19. One or more non-transitory computer readable media having instructions to perform a method for answering a domain name system ("DNS") request at a recursive DNS server, the method comprising:
- determining, by the recursive DNS server, a maximum time-to-live ("TTL") value applicable to one or more DNS requests received by the recursive DNS server;
- obtaining, by the recursive DNS server and from a client device, a DNS request for a DNS record;
- determining, by the recursive DNS server, that no answer to the DNS request is found in a memory of the recursive DNS server;
- providing, by the recursive DNS server, the DNS request to an authoritative name server;
- receiving, by the recursive DNS server and from the authoritative name server, a first answer to the DNS request that includes a first TTL value for the first answer;
- determining, at the recursive DNS server, that the maximum TTL value is applicable to the DNS request;
- determining, at the recursive DNS server, that the first TTL value included in the first answer to the DNS request received from the authoritative name server exceeds the maximum TTL value;
- retrieving a policy associated with processing DNS requests received from the client device; and
- in response to determining that the first TTL value exceeds the maximum TTL value, returning, based on the policy, a second answer with the maximum TTL value to the client device.

20. The one or more non-transitory computer readable media of claim 19, wherein returning the second answer with the maximum TTL value further comprises providing the second answer and the maximum TTL value to an intermediate DNS server in communication with the client device.

21. The one or more non-transitory computer readable media of claim 19, further comprising decreasing the maximum TTL value in time increments subsequent to the determining that the first TTL value received from the authoritative name server exceeds the maximum TTL value.

22. The one or more non-transitory computer readable media of claim 19, further comprising obtaining a command from the client device to flush the memory of the recursive DNS server by removing DNS records associated with invalid TTL values from the memory of the recursive DNS server.

23. The one or more non-transitory computer readable media of claim 19, further comprising:
- obtaining, from the client device, a subsequent DNS query for the DNS record;
- determining, by the recursive DNS server, that an answer to the subsequent DNS query is located in the memory of the recursive DNS server;
- decreasing the maximum TTL value based on a time difference between the subsequent DNS query and the DNS request to produce a second TTL value;
- storing the second TTL value; and
- returning the answer to the subsequent DNS query to the client device with the second TTL value.

24. One or more non-transitory computer readable media having instructions to perform a method for answering a domain name system ("DNS") request at a recursive DNS server, the method comprising:
- determining, by the recursive DNS server, a maximum time-to-live ("TTL") value applicable to one or more DNS requests received by the recursive DNS server;
- obtaining, by the recursive DNS server and from a client device, a DNS request for a DNS record;
- determining, by the recursive DNS server, that an answer to the DNS request is found in a memory of the recursive DNS server;
- determining, at the recursive DNS server, that the maximum TTL value is applicable to the DNS request;
- determining, by the recursive DNS server, that the maximum TTL value is less than a first TTL value for the answer to the DNS request, wherein the first TTL value is included in a first answer received by the recursive DNS server from an authoritative name server;
- retrieving a policy for the client device; and
- in response to determining that the maximum TTL value is less than the first TTL value, returning a second answer based on the policy and the maximum TTL value to the client device.

* * * * *